United States Patent [19]

Worschech et al.

[11] 4,421,886

[45] Dec. 20, 1983

[54] STABILIZER-LUBRICANT COMBINATION OF LEAD COMPOUNDS AND PARTIAL ESTERS OF PENTAERYTHRITOL AND/OR TRIMETHYLOLPROPANE WITH FATTY ACIDS FOR MOLDING COMPOSITIONS BASED ON POLYVINYL CHLORIDE

[75] Inventors: Kurt Worschech; Peter Wedl, both of Loxstedt, Fed. Rep. of Germany

[73] Assignee: Neynaber Chemie GmbH, Loxstedt, Fed. Rep. of Germany

[21] Appl. No.: 269,895

[22] Filed: Jun. 3, 1981

Related U.S. Application Data

[63] Continuation of Ser. No. 188,577, Sep. 18, 1980, abandoned, which is a continuation of Ser. No. 30,845, Apr. 17, 1979, abandoned, which is a continuation-in-part of Ser. No. 834,458, Sep. 19, 1977, abandoned.

[30] Foreign Application Priority Data

Nov. 17, 1976 [DE] Fed. Rep. of Germany ....... 2652328

[51] Int. Cl.$^3$ .............................................. C08K 5/10
[52] U.S. Cl. .................................... 524/310; 524/317
[58] Field of Search ................................ 524/310, 317

[56] References Cited

U.S. PATENT DOCUMENTS 3,542,713  11/1970  Gillio-Tos .............................. 260/23
3,824,202  7/1974  White ............................. 260/23 XA

*Primary Examiner*—Paul R. Michl
*Attorney, Agent, or Firm*—Hammond & Littell, Weissenberger & Muserlian

[57] ABSTRACT

A stabilizer-lubricant composition for molding materials based on polyvinyl chloride and/or mixed polymers containing mainly vinyl chloride comprising
(a) a partial ester of pentaerythritol and/or trimethylolpropane with a fatty acid of 8 to 22 carbon atoms, and
(b) a polybasic lead compound.

5 Claims, No Drawings

STABILIZER-LUBRICANT COMBINATION OF LEAD COMPOUNDS AND PARTIAL ESTERS OF PENTAERYTHRITOL AND/OR TRIMETHYLOLPROPANE WITH FATTY ACIDS FOR MOLDING COMPOSITIONS BASED ON POLYVINYL CHLORIDE

CROSS-REFERENCE TO RELATED APPLICATION

This is a continuation of co-pending U.S. patent application Ser. No. 188,577, filed Sept. 18, 1980, abandoned, which in turn is a continuation of U.S. patent application Ser. No. 030,845, filed Apr. 17, 1979, abandoned, which in turn is a continuation-in-part of U.S. patent application Ser. No. 834,458 filed Sept. 19, 1977, abandoned.

THE RELATED ART

It is known to stabilize polyvinyl chloride, prepared by the suspension or the block polymerization process, against the decomposing influence of heat and light with basic lead compounds like tribasic lead sulfate or dibasic lead phosphite, or dibasic lead phosphite sulfite. The effect of these lead compounds can be enhanced by the addition of metal soaps, preferably neutral or basic lead stearate and/or calcium stearate. Customarily, further additions of plasticizers, lubricants, pigments, fillers, etc. are made, depending on the end use. The resulting compositions are found to give satisfactory results when used in the production of pipes, tubes, profiles, and cables (extrusion process), as well as in the production of fittings and molded pieces (injection molding process).

Although the above-mentioned stabilizer systems show good long time thermal activity, it is, however, most disadvantageous that they do not permit the achievement of light and stable initial colors in the molded parts prepared with their help. Also, the most frequently used lead soaps are strongly dust-forming and for this reason of questionable value from an industrial hygiene point of view. It would therefore be desirable to find stabilizer-lubricant combinations that would lead to a decisive improvement of the initial colors of the compositions containing them, as compared to the known combinations, and which also would give long term stability under thermal stress. It would be especially advantageous to improve the effectiveness of the known stabilizers by combining them with other additives, with the goal of obtaining a synergistic effect.

It would further be highly beneficial to develop a combination of stabilizer-lubricant additives whereby the use of the toxic lead soaps could be avoided.

OBJECTS OF THE INVENTION

An object of the present invention is the development of a stabilizer-lubricant combination for addition to moldable compositions based on polyvinyl chloride and/or mixed polymers containing mainly vinyl chloride, which gives a readily shapable, moldable composition having good initial color, long time stability under thermal stress and low toxicity.

Another object of the present invention is the development of a stabilizer-lubricant composition for molding materials based on polyvinyl chloride and/or mixed polymers containing mainly vinyl chloride, which comprises (a) a partial ester of pentaerythritol and/or trimethylolpropane with a fatty acid of 8 to 22 carbon atoms, and (b) a polybasic lead compound, wherein 15 to 1500 parts by weight of said polybasic lead compound are present for each 100 parts by weight of said partial ester of pentacrythritol and/or trimethylolpropane.

A yet further object of the present invention is the development of a method, in the process of shaping moldable compositions based on polyvinyl chloride and/or mixed polymers containing mainly vinyl chloride, which comprises the steps of adding a stabilizer-lubricant combination to said moldable composition, subjecting the stabilized and lubricated moldable composition to the action of temperature and pressure in a shaping operation, and recovering a shaped composition, the improvement consisting of utilizing from 0.5% of 10% by weight of said moldable composition of the above mixture of (a) a partial ester of pentaerythritol and/or trimethylolpropane, and (b) a polybasic lead compound as the stabilizer-lubricant.

These and other objects of the present invention will become more apparent as the description thereof proceeds.

DESCRIPTION OF THE INVENTION

The present invention relates to novel additive mixtures of (a) partial esters of polyhydroxy aliphatic hydrocarbon compounds with fatty acids, and (b) polybasic lead compounds and their use as stabilizer-lubricant combinations in molding compositions based on polyvinyl chloride and/or mixed polymers containing mainly vinyl chloride.

More particularly, the present invention relates to a stabilizer-lubricant combination for molding materials based on polyvinyl chloride and/or mixed polymers containing mainly vinyl chloride, which comprises (a) a partial ester of a polyhydroxy compound selected from the group consisting of pentaerythritol, trimethylolypropane, and a mixture of pentaerythritol and trimethylolpropane, with a fatty acid of 8 to 22 carbon atoms, and (b) a polybasic lead compound selected from the group consisting of a dibasic lead compound, a tribasic lead compound, a tetrabasic lead compound and any mixture of said lead compounds, wherein 15 to 1500 parts by weight of said polybasic lead compound are present for each 100 parts by weight of said partial ester of pentaerythritol and/or trimethylolpropane.

The present invention also relates to the improvement in the process of shaping moldable compositions based on polyvinyl chloride and/or mixed polymers containing mainly vinyl chloride, which comprises the steps of adding a stabilizer-lubricant combination to said moldable composition, subjecting the lubricated moldable composition to the action of temperature and pressure in a shaping operation, and recovering a shaped composition, the improvement consisting of utilizing from 0.5% to 10% by weight of said moldable composition of an additive mixture which comprises (a) a partial ester of a polyhydroxy compound selected from the group consisting of pentaerythritol, trimethylolpropane, and a mixture of pentaerythritol and trimethylolpropane, with a fatty acid of 8 to 22 carbon atoms, and (b) a polybasic lead compound selected from the group consisting of a dibasic lead compound, tribasic lead compound, a tetrabasic lead compound and any mixture of said lead compounds, wherein 15 to 1500 parts by weight of said polybasic lead compound are present for each 100 parts by weight of said partial ester of pentaerythritol and/or trimethylolpropane.

Of course, the invention also relates to the moldable compositions based on polyvinyl chlkoride and/or mixed polymers containing mainly vinyl chloride, which contain the above additive mixtures of partial esters and polybasic lead compounds as a stabilizer-lubricant.

The partial esters of the invention are prepared by a generally known method involving esterification of the alkanepolyol and fatty acid components. Thus, pentaerythritol and/or trimethylolpropane can be reacted under conventional esterification conditions with fatty acids having a chain length of 8 to 22 carbon atoms, optionally in the presence of conventional esterification catalysts, to produce the partial esters of the invention. The reaction is performed in such a way, as by employing the reactants in the appropriate amounts, that the partial esters have an OH number between 120 and 600, preferably between 150 and 500. Mixtures of fatty acids can be used in preparing the partial esters, as e.g. a mixture of caprylic and capric acids. The reaction product represents a mixture of different esters and should have an acid number below 15, preferably below 8. The partial esters of pentaerythritol are preferred.

Suitable fatty acids for the preparation of the partial esters of the invention are, for instance, caprylic, capric, lauric, myristic, palmitic, stearic, and behenic acid. Synthetic fatty acids of the above-mentioned chain length, unsaturated acids, like oleic and linolenic acid, and substituted acids, like ricinoleic acid mono- and/or dihydroxystearic acid, can also be used. For practical reasons, mixtures of fatty acids are used as they are obtained from natural fats and oils.

Suitable examples of the fatty acids useful for the production of the partial esters according to the invention are aliphatic monocarboxylic acids having a chain length of 8 to 22 carbon atoms including alkanoic acids of 8 to 22 carbon atoms, such as lauric acid, tridecylic acid, myristic acid, palmitic acid, margaric acid, stearic acid, arachic acid, and behenic acid; hydroxyalkenoic and dihydroxyalkanoic acids of 8 to 22 carbon atoms such as 12-hydroxy stearic acid and 9,10-dihydroxystearic acid; alkenoic acids of 8 to 22 carbon atoms such as oleic acid, elaidic acid and crucic acid; hydroxyalkenoic acids of 8 to 22 carbon atoms such as ricinoleic acid; alkadienoic acids of 8 to 22 carbon atoms such as linoleic acid; alkatrienic acids of 8 to 22 carbon atoms such as linolenic acid; as well as mixtures of fatty acid fractions of 8 to 22 carbon atoms which are obtainable from natural fats and oils, for example, fatty acid mixtures from olive oil, rape seed oil, coconut oil, palm oil, soybean oil, cottonseed oil and linseed oil.

The polybasic lead compounds of the stabilizer-lubricant composition of the invention are the polybasic lead compounds with inorganic anions and include di-, tri- and tetra-basic lead sulfates and dibasic lead phosphite and/or phosphite-sulfite, as well as basic lead carbonates. In addition, basic lead phthalates can be used. Besides these, neutral fatty acid, preferably stearic acid, salts of lead and/or calcium, as well as basic lead soaps may, of course, optionally be used with the polybasic lead compounds. Tribasic lead sulfate is the preferred polybasic lead compound.

Further auxiliary process additives can be used in the molding compositions of the invention, such as fatty acids having about 12 to 22 carbon atoms, paraffins with a softening range of about 50° to 110° C., and/or low molecular weight polyethylene type polymers with a softening point below 140° C., as well as natural or synthetic waxes. As one skilled in the art would appreciate, these further, auxiliary process additives should not be present in an amount greater than that of the stabilizer-lubricant.

In addition, common plasticizers, such as dioctyl phthalate, dioctyl adipate, etc., as well as pigments, dyes and fillers (chalk, silica, diatomaceous earth, etc.), may be used in the polymer mixtures, in effective amounts.

The mixtures according to the invention provide good stabilizing action for polyvinyl chloride, post chlorinated polyvinvyl chloride, and mixed polymers of vinyl chloride with a predominant content of vinyl chloride. The mixed polymerization components in question are, in addition to vinyl esters like vinyl acetate, preferably acrylic acid esters and vinylidene chloride. The polymers and/or mixed polymers can be prepared by known processes, like suspension or block polymerization. Their K-value advantageously lies between about 35 and 80.

It is generally sufficient for the achievement of a good effect to add 0.5 to 10% by weight, preferably 1 to 4% by weight, of the stabilizer-lubricant mixture according to the invention, based on the weight of the polyvinyl chloride and/or the above mentioned mixed polymers.

The combinations according to the invention can be used as stabilizer-lubricant combinations in the production of pipes, profiles, tiles, cables, and other semifinished products in the extrusion process. They are also suitable in the production of fittings and molded parts by injection molding.

It is surprising that the partial fatty acid esters of pentaerythritol and trimethylolpropane of the invention effect a considerable improvement in termostability. This effect by far surpasses the effect of partial esters of glycerol, without the well known disadvantages, like the gray discoloration caused by the influence of light. The additive mixture according to the invention can be utilized to achieve, without otherwise changing the customary formulation, considerably better initial colors and a considerably more satisfactory long term behavior of the stabilizing system, or to reduce the primary stabilizer content up to 30%. Despite this reduction, there is an unchanged long term stability and an improved initial color.

Finally, through the present invention it becomes possible to omit the use of the dust-forming and toxic lead stearates by adding to the formulation being processed the amount of fatty acid required for stearate formation for the purpose of reacting with the basic primary stabilizer, i.e. to perform the reaction of the fatty acid with lead-II-oxide in the mixed aggregate and/or in the processing device.

The invention also includes a moldable composition consisting essentially of from 90% to 99.5% by weight of a thermoplastic resin selected from the group consisting of polyvinyl chloride, a mixed polymer containing mainly vinyl chloride, and any mixture thereof, from 0.5% to 10% by weight of the stabilizer-lubricant combination of the invention and from 0 to 5% by weight of further conventional auxiliary process additives selected from the group consisting of fatty acids having about 12 to 22 carbon atoms, paraffins with a softening range of about 50° to 110° C., and/or low molecular weight polyethylene, and natural or synthetic waxes.

The following examples further illustrate the invention, but without limiting the invention to these examples.

EXAMPLES

The effectiveness of the stabilizer combinations of the invention was determined by evaluating the so-called static thermostability of milled sheets containing the stabilizer. The test sheet was prepared on a 450×220 mm laboratory rolling mill with independent time control (made by Berstorff) at a roll temperature of 170° C. and a rotational speed of 12.5 rpm. Subsequently, the color change was observed in a drying oven (Heraeus FT 420R) with 6 rotating aluminum baffles and a temperature of 180° C. The samples were removed from the oven and judged by visual inspection every 15 minutes.

In the following Tables 1 to 7 the initial color of the control sample and of samples containing the partial esters of the invention is first given, followed by the time after which a definite change of the initial color was observed. Finally, the point in time is given when the test was discontinued because of strong discoloration.

The following partial esters were tested:

| | | |
|---|---|---|
| I | stearic acid ester of pentaerythritol | OH number 302 |
| II | oleic acid ester of pentaerythritol | OH number 156 |
| III | oleic acid ester of pentaerythritol | OH number 198 |
| IV | caprylic (50 mole %), capric (50 mole %) acid ester of pentaerythritol | OH number 238 |
| V | hydroxystearic acid ester of pentaerythritol | OH number 394 |
| VI | monohydroxystearic acid ester of trimethylolpropane | OH number 470 |
| VII | stearic acid ester of pentaerythritol | OH number 425 |

EXAMPLE 1

Milled sheets of the following composition were prepared and tested in accordance with the above-described oven aging method, with the testing results being reported in the following Table 1:
100 parts by weight suspension PVC (K value 60)
3 parts by weight tribasic lead sulfate
0.3 parts weight calcium stearate
2 parts by weight partial ester

TABLE 1

| Partial Ester | Initial color | Definite change of initial color | Strong Discoloration Test discontinued |
|---|---|---|---|
| Without partial ester | slightly yellowish | 60' | 180' |
| I | very slightly yellowish | 120' | 270' |
| II | very slightly yellowish | 120' | 240' |
| III | very slightly yellowish | 120' | 270' |
| IV | very slightly yellowish | 120' | 240-270' |
| V | very slightly yellowish | 120' | 270' |
| VII | very slightly yellowish | 90' | 270' |

TABLE 1-continued

| Partial Ester | Initial color | Definite change of initial color | Strong Discoloration Test discontinued |
|---|---|---|---|
| | yellowish | | |

EXAMPLE 2

Milled sheets were prepared from 100 parts by weight of suspension PVC (K value 60) and 3 parts by weight of tribasic lead sulfate and varying amounts of partial ester I and tested in accordance with the above-described oven aging method.

A lubricant of similar rheological activity (technical wax ester with average chain length C-31) was used for comparison.

The test results are given in the following Table 2.

TABLE 2

| Parts by Weight of Partial Ester | Initial Color | Definite Change of Initial Color | Strong Discoloration Test Discontinued |
|---|---|---|---|
| Without partial ester | Slightly yellowish | 30' | 165' |
| 2.0 Partial ester I | Very slightly yellowish | 135' | 235' |
| 1.5 Partial ester I | Nearly white | 120' | 210' |
| 1.0 Partial ester I | Nearly white | 60' | 195' |
| 2.0 Technical wax ester | Nearly white | 45' | 180' |

EXAMPLE 3

Milled sheets of the following composition were prepared and tested in accordance with the above-described oven aging method:
100 parts by weight suspension PVC (K value 60)
2 parts by weight tribasic lead sulfate
0.3 parts by weight calcium stearate and different parts by weight of partial ester I.

A lubricant of similar rheological activity (technical wax ester with average chain length C-31) was used for comparison.

The test results are given in the following Table 3.

TABLE 3

| Parts by Weight of Partial Ester | Initial Color | Definite Change of Initial Color | Strong Discoloration Test Discontinued |
|---|---|---|---|
| Without partial ester | Slightly yellowish | 60' | 135' |
| 1.0 Partial Ester I | Very slightly yellowish | 90' | 165' |
| 2.0 Partial ester I | Nearly white | 135' | 180' |
| 2.0 Technical wax ester | Very slightly yellowish | 75' | 165' |

EXAMPLE 4

Milled sheets of the following composition were prepared and tested in accordance with the above-described oven aging method:
100 parts by weight suspension PVC (K value 60)
1 part by weight tribasic lead sulfate and varying parts by weight of partial ester I.

A lubricant of similar rheological activity (technical wax ester with average chain length C-31) was used for comparison.

The test results are given in the following Table 4.

TABLE 4

| Parts by Weight of Ester | Initial Color | Definite Change of Initial Color | Strong Discoloration Test Discontinued |
|---|---|---|---|
| Without partial ester | Very slightly yellowish | 15' | 75' |
| 2.0 Partial ester I | Very slightly yellowish | 30' | 120' |
| 1.5 Partial ester I | Very slightly yellowish | 30' | 105' |
| 2.0 Technical wax ester | Very slightly yellowish | 15' | 75' |

EXAMPLE 5

Milled sheets of the following composition were prepared and tested in accordance with the above-described oven aging method:
100 parts by weight suspension PVC (K value 60)
1 parts by weight tribasic lead sulfate
0.5 parts by dibasic lead stearate
2.0 parts by partial ester In the following Table 5 the results are reported for the various partial esters tested. All milled sheets tested had a slightly yellowish initial color.

TABLE 5

| Parts by Weight of Partial Ester | Definite Change of Initial Color | Strong Discoloration Test Discontinued |
|---|---|---|
| Without partial ester | 60' | 120' |
| 2 Partial ester I | 105' | 135' |
| 2 Partial ester II | 90' | 135' |
| 2 Partial ester III | 90' | 135' |
| 2 Partial ester IV | 90' | 135' |
| 2 Partial ester V | 90' | 150' |
| 2 Partial ester VII | 90' | 135' |

EXAMPLE 6

Milled sheets of the following composition were prepared and tested in accordance with the above-described oven aging method:
100 parts by weight suspension PVC (K value 70)
30 parts by weight dioctyl phthalate
1.5 parts by weight tribasic lead sulfate
0.5 parts by weight dibasic lead stearate
1.5 parts by weight partial ester In the following Table 6 the results are reported for the various partial esters tested.

TABLE 6

| 1.5 Parts by Weight each of Partial Ester | Initial Color | Definite Change of Initial Color | Strong Discoloration Test Discontinued |
|---|---|---|---|
| Without partial ester | Slightly yellowish | 90' | 300' |
| Partial ester I | Very slightly yellowish | 180' | 360' |
| Partial ester IV | Nearly white | 150' | 369–390' |
| Partial ester VI | Very slightly yellowish, nearly white | 180' | 360' |

EXAMPLE 7

Milled sheets of the following composition were prepared and tested in accordance with the above-described oven aging method:
100 parts by weight suspension PVC (K value 65)
0.3 parts by weight calcium stearate
0.15 parts by weight paraffin (solidification point 105° C.)
0.15 parts by weight stearic acid and varying amounts of the additional components listed in the following Table 7.

The following Table 7 illustrates that it is possible to replace dibasic lead stearate by partial ester I without lowering the thermostability of the formulation. The initial color of the formulation is even improved by using partial ester I instead of dibasic lead stearate.

TABLE 7

| Formulation No. | Parts by Weight Additional Components | Initial Color | Definite Change of Initial Color | Strong Discoloration Test Discontinued |
|---|---|---|---|---|
| 1 | 1.0 tribasic lead sulfate 1.0 dibasic lead stearate 0.8 technical wax ester (average chain length (C-32) | Yellowish | 15' | 135' |
| 2 | 1.5 tribasic lead sulfate 0.8 technical wax ester (average chain length C-32) 0.5 stearic acid | Nearly white | 15' | 120' |
| 3 | 1.5 tribasic lead sulfate 0.8 partial ester I 0.5 stearic acid | Very slightly yellowish | 60' | 135' |

In addition, rheological determinations were performed on Formulations 1 to 3 listed in Table 7 above. A flat ribbon (20×1 mm) of each formulation was extruded on a single worm laboratory extruder (made by Troester) (screw: D=30 mm $\phi$, 1=25 D, compression 1:2). The reheological data obtained are given in the following Table 8.

TABLE 8

| Formulation No. | Torque mkp | Input/ amp. | Output gm/min | Mass Temp. (Nozzle) °C. | Mass Pressure kp/cm² Zone | | |
|---|---|---|---|---|---|---|---|
| | | | | | 1 | 2 | 3 |
| 1 | 7.2 | 5.7 | 37 | 207 | 275 | 422 | 270 |
| 2 | 9.8 | 5.8 | 44 | 203 | 261 | 400 | 260 |
| 3 | 8.5 | 5.7 | 42 | 203 | 265 | 445 | 282 |

Cylinder temperature: 150/160/170/175/165 in °C.
Tool temperature: 160/160/160 in °C.
Rotation: 40 rpm The extrudates of the three formulations have a comparable surface finish. However, Formulations 2 and 3 are considerably lighter in color. In addition, the thermostability of these flat ribbon products was determined by the above-described oven aging method. The results obtained are given in the following Table 9.

TABLE 9

| Ribbon of Formulation No. | Initial Color | Slight Darkening After | Definite Darkening After | Strong Discoloration Test Discontinued |
|---|---|---|---|---|
| 1 | Yellow, slightly brownish | 60' | 90' | 210' |
| 2 | Light | 60' | 90' | 180' |

TABLE 9-continued

| Ribbon of Formulation No. | Initial Color | Slight Darkening After | Definite Darkening After | Strong Discoloration Test Discontinued |
| --- | --- | --- | --- | --- |
| 3 | yellow Yellow | 60' | 150' | 210' |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A moldable composition consisting essentially of from 90 to 99.5% by weight of a thermoplastic resin selected from the group consisting of polyvinyl chloride, a mixed polymer containing mainly vinyl chloride, and any mixture thereof, and from 0.5 to 10% by weight of a stabilizer-lubricant composition consisting essentially of:
   (a) a stearic acid ester of pentaerythritol which has an OH number between 120 and 600 and an acid number below 15, and
   (b) a tribasic lead compound, wherein 15 to 1500 parts by weight of tribasic lead compound are present for each 100 parts by weight of said stearic acid ester of pentaerythritol.

2. The moldable composition of claim 1, wherein the stabilizer-lubricant composition additionally comprises from 0 to 50% by weight of other auxiliary process additives selected from the group consisting of fatty acids having about 12 to 22 carbon atoms, paraffins, low molecular-weight polyethylene, and natural or synthetic waxes, based on the total weight of the stabilizer-lubricant plus other auxiliary process additives.

3. The moldable composition of claim 1 which additionally contains plasticizers, pigments, dyes, fillers, or any mixture thereof.

4. The moldable composition of claim 1, wherein the thermoplastic resin is polyvinyl chloride.

5. A method of stabilizing molding compositions based on polyvinyl chloride and/or mixed polymers containing mainly vinyl chloride, which comprises adding to said molding compositions a stabilizing amount of a stabilizer-lubricant composition consisting essentially of:
   (a) a stearic acid ester of pentaerythritol which has an OH number between 120 and 600 and an acid number below 15, and
   (b) a tribasic lead compound, wherein 15 to 1500 parts by weight of tribasic lead compound are present for each 100 parts by weight of said stearic acid ester of pentaerythritol.

* * * * *